United States Patent
Ishikawa et al.

(10) Patent No.: US 8,011,198 B2
(45) Date of Patent: Sep. 6, 2011

(54) METHOD OF PREHEATING INVERTER-DRIVEN COMPRESSOR AND DEVICE THEREFOR

(75) Inventors: Satoshi Ishikawa, Osaka (JP); Takeshi Hikawa, Osaka (JP); Toshiyuki Maeda, Shiga (JP); Sumikazu Matsuno, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 1069 days.

(21) Appl. No.: 11/587,527

(22) PCT Filed: Apr. 22, 2005

(86) PCT No.: PCT/JP2005/007690
§ 371 (c)(1),
(2), (4) Date: Jul. 6, 2007

(87) PCT Pub. No.: WO2005/103582
PCT Pub. Date: Nov. 3, 2005

(65) Prior Publication Data
US 2008/0134702 A1 Jun. 12, 2008

(30) Foreign Application Priority Data

Apr. 26, 2004 (JP) ................. 2004-129729
Mar. 9, 2005 (JP) ................. 2005-064939

(51) Int. Cl.
F25B 49/00 (2006.01)
H02P 7/00 (2006.01)
H02P 27/04 (2006.01)

(52) U.S. Cl. .............. 62/228.4; 318/436; 318/801
(58) Field of Classification Search ............. 62/228.4; 318/599, 433, 434, 436, 798, 801
See application file for complete search history.

(56) References Cited

U.S. PATENT DOCUMENTS
5,959,428 A * 9/1999 Saito et al. ............ 318/705

FOREIGN PATENT DOCUMENTS

| EP | 1 953 477 A1 | 8/2008 |
| JP | 62-258964 A | 11/1987 |
| JP | 2-264171 A | 10/1990 |
| JP | 5-288411 A | 11/1993 |
| JP | 8-9683 A | 1/1996 |
| JP | 2000-292014 A | 10/2000 |

* cited by examiner

Primary Examiner — Chen-Wen Jiang
(74) Attorney, Agent, or Firm — Birch, Stewart, Kolasch & Birch, LLP.

(57) ABSTRACT

To reduce a leakage current when a motor for driving a compressor is energized, with the compressor unoperated. Setting the carrier frequency of an inverter at a value lower than that used during normal operation to cause phase interruption electrification of the motor.

8 Claims, 3 Drawing Sheets

F I G. 4
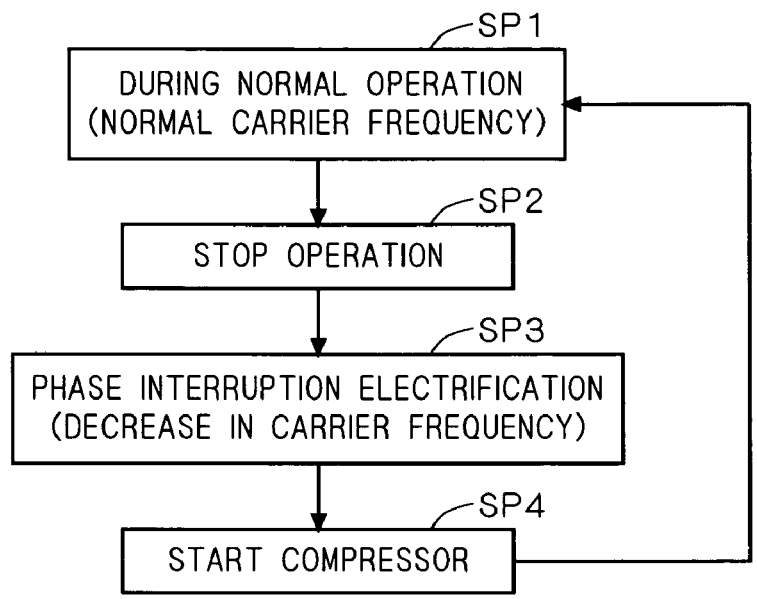
F I G. 5
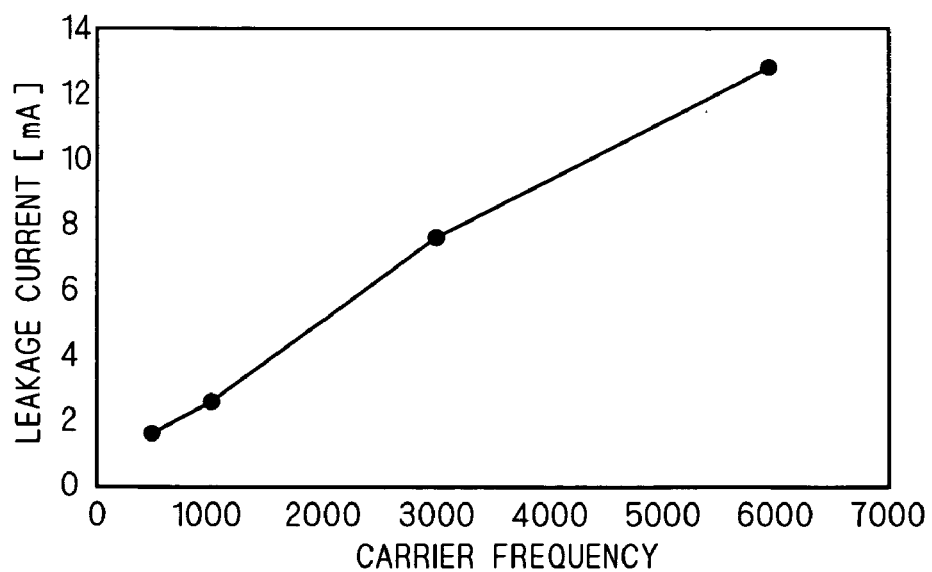

METHOD OF PREHEATING INVERTER-DRIVEN COMPRESSOR AND DEVICE THEREFOR

TECHNICAL FIELD

The present invention relates to a preheating method for raising the temperature of an inverter-driven compressor, and a device therefor.

BACKGROUND ART

Conventionally, it has been known that, when a compressor is started under cooled conditions, a large amount of liquid refrigerant dissolves in a lubricating oil to make the lubricating oil dilute, giving rise to apprehension about the breakage of the compressor.

For the purpose of preventing the breakage of the compressor, it has been proposed to detect the voltage and current applied to the compressor to calculate the resistance of a motor winding of the compressor from the values of the voltage and current, and to calculate the current temperature of the compressor by utilizing the temperature characteristic of the resistance to preheat the compressor when the current temperature is not more than a predetermined temperature (See Japanese Patent Application Laid-Open No. 5-288411 (1993)).

Further, it has been proposed to cause restraint electrification (phase interruption electrification) of the winding of a motor for driving the compressor when the temperature of outside air is not more than a first set temperature at which there is a possibility that a refrigerant migrates in the compressor and when the temperature of a radiator for an inverter and the like is not more than a second set temperature at which the inverter is assumed not to be driven (See Japanese Patent Application Laid-Open No. 2000-292014).

DISCLOSURE OF INVENTION

Problems to be Solved by Invention

Patent Document 1 states the use of direct-current preheating for the preheating of the compressor. Also, Patent Document 2 states the use of the restraint electrification (phase interruption electrification) for the preheating of the compressor. However, because there is no disclosure about a change in the carrier frequency of the inverter, the same carrier frequency as in normal operation is adopted. The carrier frequency is set at a considerably high value in consideration for noise generation and the like. If a motor for driving the compressor is immersed in a liquid refrigerant when the direct-current preheating is performed by the motor for driving the compressor or when the restraint electrification of the motor for driving the compressor is caused, a leakage current significantly increases as a matter of course to result in a trouble such that an earth leakage breaker is brought into operation.

The present invention has been made to solve the above-mentioned problems. It is therefore an object of the present invention to provide a method of preheating an inverter-driven compressor and a device therefor which are capable of reducing a leakage current when a motor for driving the compressor is energized, with the compressor unoperated, while the motor for driving the compressor is immersed in a lubricating oil.

Means for Solving Problems

The present invention is intended for a method of preheating an inverter-driven compressor, the inverter-driven compressor being operated by a motor serving as a driving source, the motor being supplied with an output electric power from an inverter, the inverter-driven compressor compressing a refrigerant to discharge the compressed refrigerant to a circulating flow passage. The method comprises operating the inverter at a carrier frequency lower than that used during normal operation, with the compressor unoperated, to energize the motor.

In this case, the motor is energized, with the compressor unoperated. Thus, if a liquid refrigerant is dissolved in a lubricating oil, the temperature of the compressor can be raised while the apprehension about the breakage of the compressor is prevented, and the refrigerant dissolved in the lubricating oil can be gasified. Further, even if the motor is immersed in the lubricating oil, the decrease in the carrier frequency reduces a leakage current to prevent a trouble such that an earth leakage breaker malfunctions.

The carrier frequency lower than that used during normal operation may be a carrier frequency lower than that used when a rated cooling or heating capacity is produced, a carrier frequency lower than that used when a capacity that is one-half a rated cooling or heating capacity is produced, or a carrier frequency lower than the highest carrier frequency provided when the number of revolutions of the compressor ranges from 10 rps to 120 rps.

The present invention is intended for a device for preheating an inverter-driven compressor, the inverter-driven compressor being operated by a motor serving as a driving source, the motor being supplied with an output electric power from an inverter, the inverter-driven compressor compressing a refrigerant to discharge the compressed refrigerant to a circulating flow passage. The device comprises energization control means for operating the inverter at a carrier frequency lower than that used during normal operation, with the compressor unoperated, to energize the motor.

In this case, the motor is energized, with the compressor unoperated. Thus, if a liquid refrigerant is dissolved in a lubricating oil, the temperature of the compressor can be raised while the apprehension about the breakage of the compressor is prevented, and the refrigerant dissolved in the lubricating oil can be gasified. Further, even if the motor is immersed in the lubricating oil, the decrease in the carrier frequency reduces a leakage current to prevent a trouble such that an earth leakage breaker malfunctions.

The carrier frequency lower than that used during normal operation may be a carrier frequency lower than that used when a rated cooling or heating capacity is produced, a carrier frequency lower than that used when a capacity that is one-half a rated cooling or heating capacity is produced, or a carrier frequency lower than the highest carrier frequency provided when the number of revolutions of the compressor ranges from 10 rps to 120 rps.

Effects of the Invention

Even if the motor is immersed in the lubricating oil, the leakage current is reduced, and the occurrence of a trouble such that the earth leakage breaker malfunctions is suppressed.

BRIEF DESCRIPTION OF DRAWINGS

FIG. 4 is a flow chart illustrating an example of an afterheat process of the inverter-driven compressor.

FIG. 5 is a graph showing an example of a leakage current versus carrier frequency characteristic.

BEST MODE FOR CARRYING OUT THE INVENTION

Detailed description will now be given on a preferred embodiment of a method of preheating an inverter-driven compressor and a device therefor according to the present invention with reference to the accompanying drawings.

Figure 1:
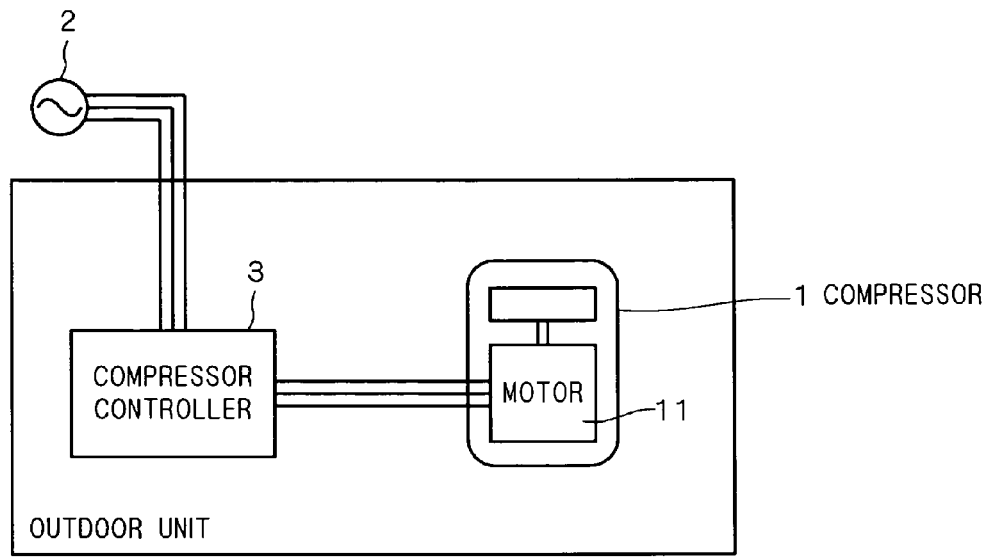
FIG. 1 is a schematic block diagram showing the construction of principal parts of an air conditioner outdoor unit to which a migration detection method and a starting method for an inverter-driven compressor according to the present invention are applied.

FIG. 1 is a schematic block diagram showing the construction of principal parts of an air conditioner outdoor unit to which the method of preheating the inverter-driven compressor according to the present invention is applied.

This air conditioner outdoor unit includes a compressor 1 having a motor 11 serving as a driving source, and a compressor controller 3 receiving an input from an alternating-current power supply (preferably a three-phase alternating-current power supply) 2 and for performing a predetermined process to supply a driving electric power to the motor 11.

Motors having a variety of constructions such as a three-phase synchronous motor may be adopted as the aforesaid motor 11.

Figure 2:
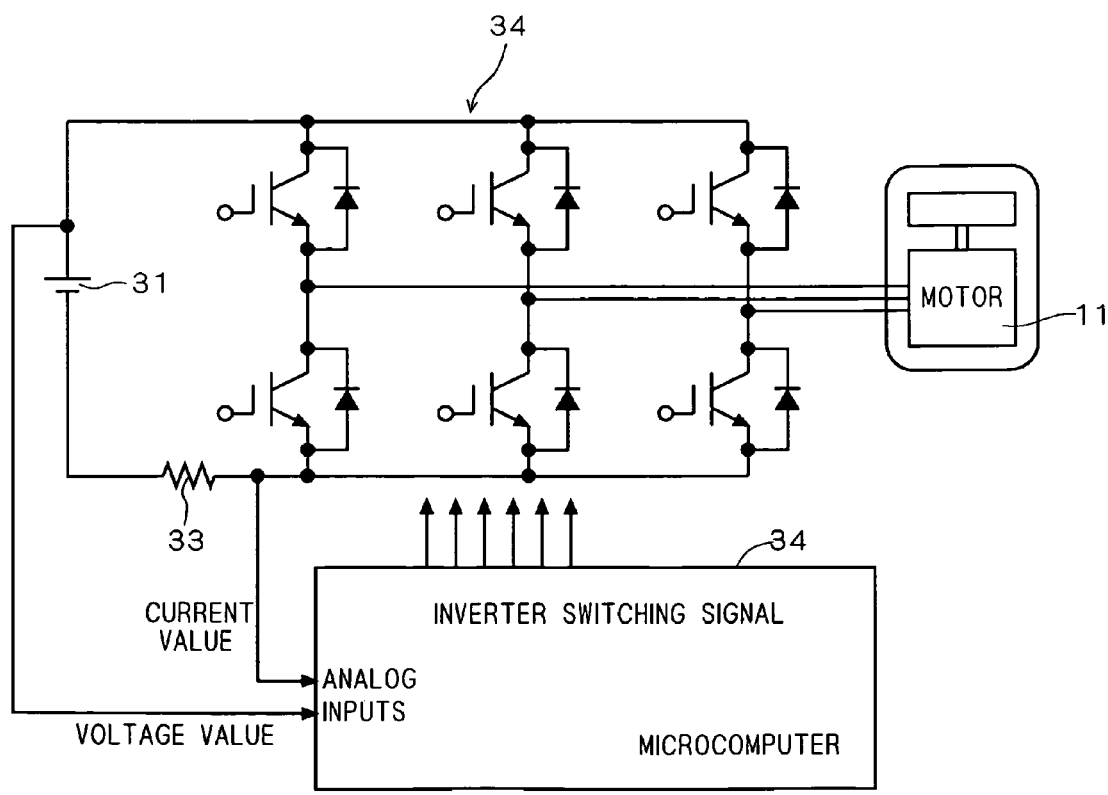
FIG. 2 is a detailed block diagram showing the construction of a compressor controller.

As shown in FIG. 2, the aforesaid compressor controller 3 includes a direct-current power supply 31 such as a converter which receives an input from the alternating-current power supply 2, a three-phase inverter 32 receiving an input from the direct-current power supply 31 and for performing a predetermined switching operation to output a three-phase alternating-current electric power, thereby supplying the three-phase alternating-current electric power as the driving electric power to the motor 11, a resistor 33 connected between the direct-current power supply 31 and the three-phase inverter 32, and a microcomputer 34 receiving as inputs a voltage outputted from the direct-current power supply 31 and a current detected using the resistor 33 and for performing a predetermined process (for example, the process of judging whether to cause an open-phase operation or a normal operation) to output control signals (inverter switching signals) to respective transistors of the three-phase inverter 32.

Figure 3:
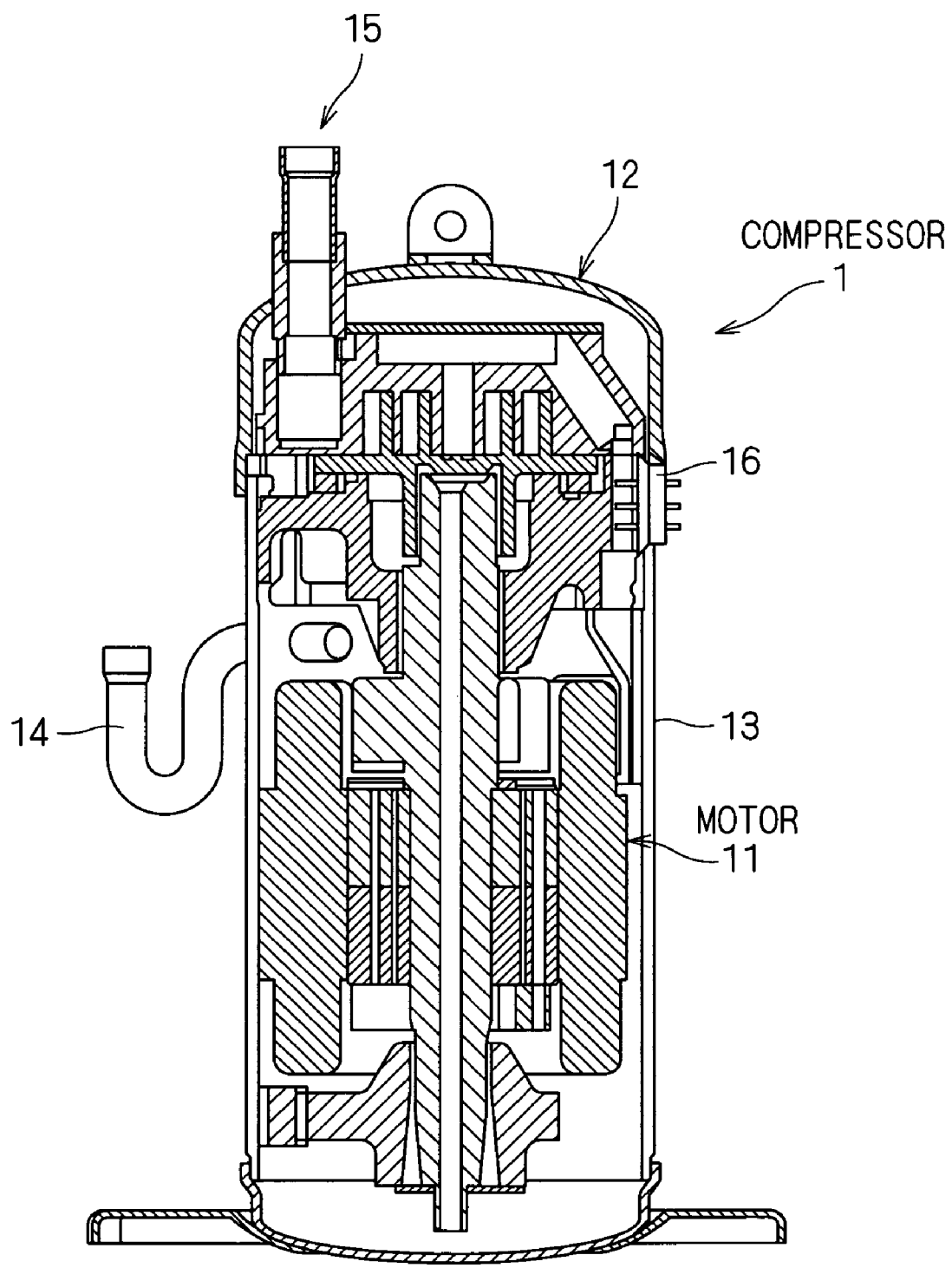
FIG. 3 is a vertical sectional view showing the construction of the compressor.

As shown, for example, in FIG. 3, the aforesaid compressor 1 includes a compression mechanism part 12 and the motor 11 serving as the driving source within a compressor casing 13 having a refrigerant discharge pipe 14 and a refrigerant suction pipe 15. The reference numeral 16 designates a terminal for feeding power to the motor 11.

FIG. 4 is a flow chart illustrating an example of the process of preheating the inverter-driven compressor.

In Step SP1, when the compressor is operated, the carrier frequency of the inverter is set at a first carrier frequency used during normal operation. Then, when the operation of the compressor is stopped in Step SP2, the carrier frequency of the inverter is set at a second carrier frequency lower than the first carrier frequency, and phase interruption electrification is caused to preheat the compressor, in Step SP3. Then, when an instruction for starting the compressor is inputted, the compressor is started in Step SP4.

The completion of the preheating of the compressor may be detected by temperature detection, phase interruption electrification time detection, and the like.

Thus, when the process in the flow chart of FIG. 4 is performed, the preheating resulting from the phase interruption electrification is performed without exception prior to the start of the compressor. Therefore, the compressor is started after the temperature of the compressor is raised.

In the process of energizing the motor so as not to rotate the motor in the preferred embodiment of FIG. 4, the carrier frequency of the inverter included in the compressor controller 3 is set at a value lower than the carrier frequency used during normal operation. This reduces a leakage current, as shown in FIG. 5, to prevent a trouble such that an earth leakage breaker is brought into operation during the process of energizing the motor so as not to rotate the motor.

Specifically, it is preferable to set at about 300 Hz or less, and a leakage current not more than 1 mA is attainable which is a leakage current standard in Electrical Appliance and Material Safety Law.

In the above description, the process in the flow chart of FIG. 4 may be performed when power to the outdoor unit is turned on. However, the process in the flow chart of FIG. 4 may be performed also when a compressor operation instruction is provided during normal operation.

The invention claimed is:

1. A method of preheating an inverter-driven compressor, the inverter-driven compressor being operated by a motor serving as a driving source, the motor being supplied with an output electric power from an inverter, the inverter-driven compressor compressing a refrigerant to discharge the compressed refrigerant to a circulating flow passage, the method comprising:
   operating the inverter at a carrier frequency lower than that used during normal operation, with the compressor unoperated, to energize the motor,
   wherein the carrier frequency corresponds to a switching frequency of the inverter.

2. The method according to claim 1, wherein the carrier frequency lower than that used during normal operation is a carrier frequency lower than that used when a rated cooling or heating capacity is produced.

3. The method according to claim 1, wherein the carrier frequency lower than that used during normal operation is a carrier frequency lower than that used when a capacity that is one-half a rated cooling or heating capacity is produced.

4. The method according to claim 1, wherein the carrier frequency lower than that used during normal operation is a carrier frequency lower than the highest carrier frequency provided when the number of revolutions of the compressor ranges from 10 rps to 120 rps.

5. A device for preheating an inverter-driven compressor, the inverter-driven compressor being operated by a motor serving as a driving source, the motor being supplied with an output electric power from an inverter, the inverter-driven compressor compressing a refrigerant to discharge the compressed refrigerant to a circulating flow passage, the device comprising:
   energization control means for operating the inverter at a carrier frequency lower than that used during normal operation, with the compressor unoperated, to energize the motor,
   wherein the carrier frequency corresponds to a switching frequency of the inverter.

6. The device according to claim 5, wherein the carrier frequency lower than that used during normal operation is a carrier frequency lower than that used when a rated cooling or heating capacity is produced.

7. The device according to claim 5, wherein the carrier frequency lower than that used during normal operation is a carrier frequency lower than that used when a capacity that is one-half a rated cooling or heating capacity is produced.

8. The device according to claim 5, wherein the carrier frequency lower than that used during normal operation is a carrier frequency lower than the highest carrier frequency provided when the number of revolutions of the compressor ranges from 10 rps to 120 rps.

* * * * *